United States Patent
Haskett et al.

[15] 3,650,443
[45] Mar. 21, 1972

[54] CARRIER CONNECTABLE TO AUTOMOBILE BUMPER AND TRAILER HITCH

[72] Inventors: Harlan G. Haskett, 5050 West 11th St., Indianapolis, Ind. 46224; Timothy B. Willoughby, 5811 Bar Dell, Indianapolis, Ind. 46241

[22] Filed: Nov. 23, 1970

[21] Appl. No.: 91,882

[52] U.S. Cl. .................................224/42.03 A, 224/42.07
[51] Int. Cl. ...........................................B60r 9/06
[58] Field of Search............224/42.03 R, 42.03 A, 42.03 B, 224/42.04, 42.05, 42.06, 42.07, 42.08, 42.43, 42.44

[56] References Cited

UNITED STATES PATENTS

| | | | |
|---|---|---|---|
| 1,641,502 | 9/1927 | Price | 224/42.08 |
| 2,551,901 | 5/1951 | Richardson | 224/42.44 X |
| 2,746,659 | 5/1956 | Caruolo | 224/42.07 |
| 2,941,706 | 6/1960 | Slater | 224/42.08 |

*Primary Examiner*—Gerald M. Forlenza
*Assistant Examiner*—Frank E. Werner
*Attorney*—Woodard, Weikart, Emhardt & Naughton

[57] ABSTRACT

A wheelless carrier connectable to an automobile bumper and trailer hitch. A rectangular grid frame having a mesh screen fixed to its top surface is positioned above and extends out from the automobile bumper. A pair of bumper mounts mounted to the bumper are positioned on either side of a trailer hitch extending out beneath the bumper. Legs fixedly attached to the frame are lockingly received by the bumper mounts. A pair of cross struts have top ends fixed to the outer edge of the frame and extend downward and inward in a general V-shape having lower ends connected to a trailer hitch receiving device. A vertical member connected to the underside of the frame is fixedly mounted atop the trailer hitch receiving device. An animal house having air vents and a hinged door is removably mounted atop the frame.

6 Claims, 3 Drawing Figures

PATENTED MAR 21 1972 3,650,443
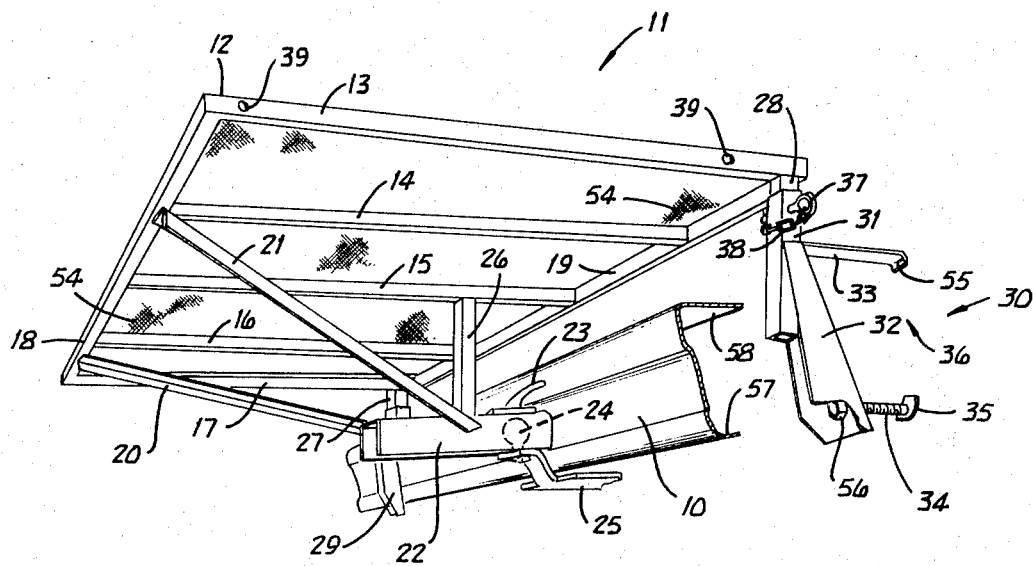
Fig.1.
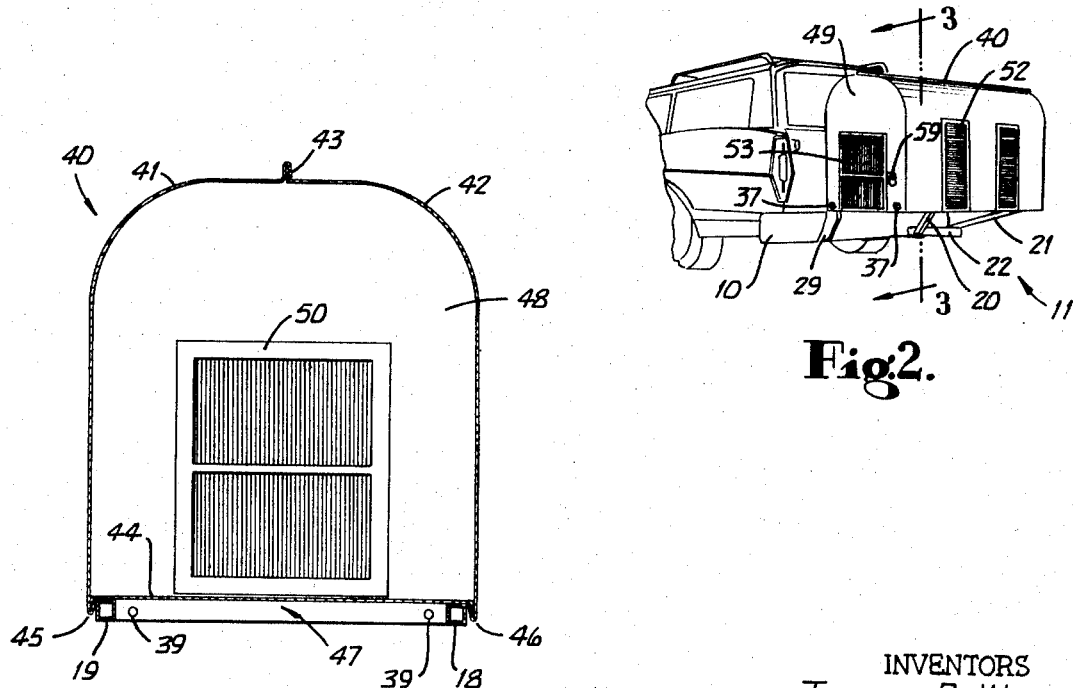
Fig.2.
Fig.3.
INVENTORS
TIMOTHY B. WILLOUGHBY
HARLAN G. HASKETT
BY
Woodard Weikart Emhardt & Naughton
ATTORNEYS

CARRIER CONNECTABLE TO AUTOMOBILE BUMPER AND TRAILER HITCH

BACKGROUND OF THE INVENTION

1. Field of the Invention

This invention relates to a carrier attachable to the bumper and trailer hitch of an automobile.

2. Description of the Prior Art

Luggage racks which are fastened to an automobile have long been known in the art. Some of these racks are positioned on top of the automobile while other racks are positioned on the rear bumper of the automobile. Those racks located at the rear of the automobile are protected from the wind by the automobile body. Some of these prior art devices are shown in the following U.S. Pats. No. 2,746,659 issued to Caruolo; No. 2,593,908 issued to Monteverde; No. 3,163,339 issued to Merchant; and No. 3,367,548 issued to Cooper. Many of these prior art devices require modification to the automobile bumper such as holes being drilled in the bumper. Others used coiled springs, while others clamp to the trunk lip. The prime disadvantage of the prior art carriers is the fact that the carrier rack frames are not supported sufficiently to receive large forces.

The present invention circumvents the disadvantage of the prior art by having a pair of cross struts which are formed in a general V configuration. The struts are attached to the extremities of the frame and apply the force to a standard trailer hitch.

SUMMARY OF THE INVENTION

This invention is a carrier mounted to an automobile bumper and trailer hitch. The carrier has a horizontal grid frame centered with respect to the trailer hitch and mounted atop a coupling lockingly connectable to the trailer hitch. A pair of cross struts having top ends fixedly attached to the frame extend downward and inward with their bottom ends fixedly attached to the coupling receiving the trailer hitch. A pair of legs connected to the frame extend downward being removably connected to mounts mounted to the bumper on either side of the trailer hitch.

It is an object of the present invention to provide a wheelless carrier removably connected to an automobile bumper at two locations and to a standard automobile trailer hitch at a third location.

It is a further object of the present invention to provide a carrier being connectable to a trailer hitch positioned generally beneath the center line of the carrier with a pair of struts extending upward and outward from the hitch to the outer periphery of the carrier.

In conjunction with the above objects, it is an object of the present invention to provide a wheelless carrier which may be connected and unconnected quickly and easily without requiring any modification to the automobile bumper.

Related objects and advantages of the present invention will be apparent from the following description.

BRIEF DESCRIPTION OF THE DRAWING

FIG. 1 is a fragmentary perspective view of an automobile carrier incorporating the present invention shown attached to an automobile bumper and trailer hitch.

FIG. 2 is a perspective view of an animal house mounted atop the automobile carrier of FIG. 1.

FIG. 3 is a sectional view of the house of FIG. 2 taken along the line 3—3 and viewed in the direction of the arrows.

DESCRIPTION OF THE PREFERRED EMBODIMENT

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a fragmentary perspective view of carrier 11 mounted to automobile bumper 10. Carrier 11 has a frame 12 centered generally with respect to ball 24 and has beams 13, 14, 15, 16 and 17 integrally joined to beams 18 and 19 in a rectangular configuration. Beams 13 through 19 are made from metal and are welded together forming one integral assembly. Excellent results have been obtained by producing beams 13 through 19 with standard one inch metal tubing. Fixedly mounted to the top of beams 13 through 19 is a continuous mesh screen 54 which extends completely across frame 12. Cross struts 20 and 21 are fixedly attached to beam 18 and project downward and inward having their lower ends fixedly attached to ball socket receiving device 22. Beam 18 is generally parallel with bumper 10 and is the most outer element of carrier 11 with respect to bumper 10. Strut 20 is welded to beam 18 at a location between beams 16 and 17. Likewise, cross strut 21 is welded to beam 18 at a location between beams 13 and 14. Vertical support member 26 has its top end fixedly mounted to beam 15 and projects vertically downward with its bottom end welded to device 22. Extension 25 is fixedly attached to the automobile preferably to the automobile frame, and has a conventional ball 24 mounted atop its end. Ball socket receiving device 22 receives ball 24 and has a handle 23 for locking and unlocking device 22 with respect to ball 24. Device 22 as well as ball 24 and extension 25 are standard items and are readily purchasable. Thus, further elaboration on items 22, 24 and 25 by this specification would be superfluous.

Welded to the bottom surface of beams 17 and 19 is leg 27 which projects downward into bumper mount 29 removably mounted to bumper 10. Likewise, welded to the bottom of beams 13 and 19 is leg 28 which is slidingly received into bumper mount 30 removably mounted to bumper 10. Mounts 29 and 30 are positioned equidistant from coupling 22. Bumper mount 30 will now be described it being understood that an identical description applies to bumper mount 29. Bumper mount 30 has a vertically erect hollow channel tube 31 welded to flanged member 32. A fixed arm 33 is welded to the top of member 32 and has a curved finger 55 for curling around the top edge 58 of bumper 10. Threadedly received by the bottom of member 32 is bolt 34 which passes freely through member 32 being threadedly received by nut 56. Mounted to the head of bolt 34 is finger 35 for abutting against the lower edge 57 of bumper 10. Member 32 slants downward from arm 33 to bolt 34 at an approximate angle equal to the slant of bumper 10. A bumper receiving cavity 36 is thereby formed between member 32, arm 33 and bolt 34 for receiving bumper 10. Leg 28 is locked into channel tube 31 by removable bolt 37 which extends freely through aligned holes in leg 28 and tube 31. Both ends of bolt 37 project from tube 31. A chain 38 is fixedly connected to one end of bolt 37 and is removably connected to the opposite end of the bolt preventing accidental disengagement of the bolt from the tube. Leg 27 is locked in bumper mount 29 by a similar bolt-chain arrangement.

Bumper mounts 29 and 30 are installed on the bumper of the automobile prior to connecting carrier 11 to the automobile. The bumper is placed between fixed arm 33 and movable bolt 34 of each bumper mount and the bolts of each bumper mount are tightened by nuts 56. Legs 27 and 28 are then slipped into bumper mounts 29 and 30 with bolts 37 and chains 38 locking the bars and mounts together. Simultaneously, device 22 is slipped over ball 24 and handle 23 is operated to securely lock device 22 and ball 24 together.

FIG. 2 is a perspective view of an animal house 40 removably mounted atop carrier 11. FIG. 3 is a sectional view taken along the line 3-3 and viewed in the direction of the arrows in FIG. 2. A curved wall 41 is joined to a similar curved wall 42 at seam 43 extending the length and positioned at the top of the house. Seam 43 is produced by overlapping one edge of wall 41 with an adjacent edge of wall 42 and pinching the two edges together. All of the walls of house 40 are made from standard sheet metal. House 40 has a bottom wall 44 united to walls 41 and 42 in a similar manner. Seams 45 and 46 are formed by overlapping the edges of walls 41 and 42 with the edges of bottom wall 44. The seams may then be pinched together by a standard sheet metal pinching tool. Bottom wall 44 is positioned upward from the bottom edge of walls 41 and 42 in order to form recess 47 for receiving carrier 11. Thus, beams 18 and 19 are positioned between seams 45 and 46 of the side walls being partially concealed thereby. Likewise, beams 13 through 17 are not visible when observing house 40 at an elevation higher than the elevation of house 40. End walls 48 and 49 are mounted to and joined with walls 41 and 42 in a manner similar to the formation of seam 43. The present invention contemplates and includes a variety of means of fastening the walls together.

Fixedly mounted to wall 48 is air vent 50. Similar air vents 52 are positioned in walls 41 and 42. Vent 53 is hingedly mounted to end wall 49 thereby providing a door which may be opened and closed. A suitable lock 59 prevents door 53 from opening accidentally. Excellent results have been obtained by using a standard padlock for lock 59. Vents 50, 52 and 53 are quite conventional being very similar to the furnace vents in most homes. Vents 52 may be operable in such a manner so as to close or open the louvers provided in the vents. On the other hand, vents 53 and 50 have fixed louvers and may not be closed. Standard leaf hinges, not shown, are used to mount vent 53 to wall 49. Through holes 39 (FIG. 1) are provided in beams 13 and 17 being aligned with identical through holes provided in end walls 48 and 49. Thus, house 40 may be positioned and mounted to carrier 11 with holes 39 of beams 13 and 17 being automatically aligned with identical holes in walls 49 and 48. Bolts 37 previously described are then inserted through the holes in end walls 48 and 49 and beams 13 and 17 and have chains 38 previously described connected to the ends of the bolts. Two bolts 37 are shown in FIG. 2 passing through wall 49; however, it is understood that two additional bolts 37 not shown also pass through wall 48 securing the wall to the adjacent beam.

The described carrier provides for an even distribution of the weight exerted on frame 11 through cross struts 20 and 21 to coupling device 22. Thus, carrier 11 will withstand a greater cargo weight with greater safety. The bumper mounts allow for stabilization of the carrier and may be permanently attached to the rear bumper of the automobile. It will be obvious from the above description that the present invention provides a wheelless carrier removably connected to an automobile bumper at two locations and to a standard automobile trailer hitch at a third location. It will be further obvious from the above description that the present invention provides a carrier being connectable to a trailer hitch positioned generally beneath the center line of the carrier with a pair of struts extending upward and outward from the hitch to the outer periphery of the carrier. In addition, the wheelless carrier may be connected or unconnected to an automobile quickly and easily without requiring any modification to the automobile.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A wheelless carrier removably mountable to a bumper and a trailer hitch ball connected to an automobile comprising:
   a coupling lockingly connectable to said ball;
   a pair of bumper mounts removably mountable to said bumper being positioned equidistant from and on each side of said coupling;
   a horizontal grid frame centered with respect to said ball and being fixedly mounted over and to said coupling, said frame having an outer beam extending generally parallel with said bumper;
   a pair of cross struts having top ends fixedly attached to said outer beam and bottom ends fixedly attached to said coupling, said struts extend from said beam downward and inward to said coupling forming a general V shape; and,
   a pair of legs connected to said frame and being removably connectable to said mounts.

2. The carrier of claim 1 additionally comprising:
   a vertically erect support element fixedly attached to the underside of said frame and to the top-side of said coupling;
   a mesh screen fixedly attached to and completely across said frame, and wherein:
   said frame is rectangular in shape and has a plurality of beams integrally interconnected;
   said mounts are hollow and lockingly receive said legs, said mounts each have a curved fixed hinge and an adjustable finger lockingly embraceable with said bumper.

3. THe carrier of claim 2 wherein:
   said mounts are positioned in line with the opposite ends of said frame; and,
   said frame is positioned above said bumper.

4. The carrier of claim 1 additionally comprising:
   an animal house removably mounted atop said frame having a hinged lockable door and air vents.

5. The carrier of claim 4 wherein:
   said house has a recessed bottom wall abutting said frame, said house has side and end walls extending around the periphery of said frame.

6. The carrier of claim 1 wherein:
   said outer beam is the most distant element of said carrier from said bumper.

* * * * *